United States Patent
Hedge et al.

(10) Patent No.: US 11,149,796 B2
(45) Date of Patent: Oct. 19, 2021

(54) POWER TAKE OFF INCLUDING A TORSIONAL VIBRATION DAMPING ASSEMBLY

(71) Applicants: Parker-Hannifin Corporation, Cleveland, OH (US); Jason A. Friend, Collierville, TN (US)

(72) Inventors: Jonathan S. Hedge, Cleveland, OH (US); Gregory Friend, Cleveland, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 138 days.

(21) Appl. No.: 16/337,425

(22) PCT Filed: Oct. 30, 2017

(86) PCT No.: PCT/US2017/058948
§ 371 (c)(1),
(2) Date: Mar. 28, 2019

(87) PCT Pub. No.: WO2018/081673
PCT Pub. Date: May 3, 2018

(65) Prior Publication Data
US 2020/0132126 A1    Apr. 30, 2020

Related U.S. Application Data

(60) Provisional application No. 62/414,760, filed on Oct. 30, 2016.

(51) Int. Cl.
*F16D 3/12*    (2006.01)
*B60K 17/28*   (2006.01)
(Continued)

(52) U.S. Cl.
CPC ............... *F16D 3/12* (2013.01); *B60K 17/28* (2013.01); *B60K 25/00* (2013.01); *F16D 3/66* (2013.01);
(Continued)

(58) Field of Classification Search
CPC .... F16H 57/0006; F16D 3/66; F16D 2300/22; F16D 3/12
See application file for complete search history.

(56) References Cited

U.S. PATENT DOCUMENTS

| | | | |
|---|---|---|---|
| 1,088,241 A | * | 2/1914 | Royce ...................... F16D 3/66 464/66.1 |
| 3,027,775 A | | 4/1962 | Hoof |

(Continued)

FOREIGN PATENT DOCUMENTS

| | | |
|---|---|---|
| DE | 102004044080 A1 | 3/2006 |
| DE | 102010048507 A1 | 4/2011 |

(Continued)

OTHER PUBLICATIONS

PCT International Search Report and Written Opinion, Application No. PCT/US2017/058948, dated May 2, 2018.
(Continued)

*Primary Examiner* — Terence Boes
(74) *Attorney, Agent, or Firm* — MacMillan, Sobanski & Todd, LLC (57) ABSTRACT

A power take off includes a housing, an input mechanism that is supported in the housing and is adapted to be rotatably driven by a source of rotational energy, and an output mechanism that is supported in the housing and is rotatably driven by the input mechanism, the output mechanism being adapted to rotatably drive a rotatably driven accessory. The power take off further includes a two piece damping assembly that minimizes the transmission of torque transients from (Continued)

the input mechanism to the output mechanism. The two piece damping assembly may be an input cluster gear assembly that includes a first gear portion and a second gear portion that are supported for rotational movement relative to one another. The two piece damping assembly may also be part of a clutch assembly for selectively the output mechanism to be rotatably driven by the input mechanism.

11 Claims, 9 Drawing Sheets

(51) Int. Cl.
  *B60K 25/00*    (2006.01)
  *F16D 3/66*    (2006.01)
  *F16F 15/14*    (2006.01)
  *F16H 55/17*    (2006.01)
  *F16H 57/00*    (2012.01)

(52) U.S. Cl.
  CPC ......... *F16F 15/1442* (2013.01); *F16H 55/17* (2013.01); *F16H 57/0006* (2013.01); *F16D 2300/00* (2013.01); *F16D 2300/22* (2013.01)

(56) References Cited

U.S. PATENT DOCUMENTS

| | | | | |
|---|---|---|---|---|
| 4,811,615 A * | 3/1989 | Rea | ......................... | F16H 3/095 |
| | | | | 74/375 |
| 5,146,804 A * | 9/1992 | Carmillet | ................... | F16D 3/66 |
| | | | | 464/66.1 |
| 5,214,975 A * | 6/1993 | Zalewski | ................... | F16D 3/78 |
| | | | | 464/73 |
| 6,497,313 B1 * | 12/2002 | Blalock | ................... | B60K 17/28 |
| | | | | 192/18 A |
| 7,159,701 B2 * | 1/2007 | Graves | ................... | A01B 71/06 |
| | | | | 192/12 C |
| 9,157,487 B2 * | 10/2015 | Alford | ..................... | F16D 67/04 |
| 10,843,558 B2 * | 11/2020 | Burrell | ................... | B60K 17/28 |
| 2002/0128098 A1 | 9/2002 | Mott et al. | | |
| 2015/0292577 A1 * | 10/2015 | Anglin | ....................... | F02C 7/00 |
| | | | | 74/577 R |
| 2016/0076634 A1 | 3/2016 | Mitsubori et al. | | |
| 2016/0138697 A1 * | 5/2016 | Kancherla | ............ | F16H 57/0006 |
| | | | | 74/409 |
| 2017/0058991 A1 * | 3/2017 | Kim | ........................... | F16D 3/68 |
| 2017/0072793 A1 * | 3/2017 | Blalock | ................... | B60K 17/28 |
| 2017/0356542 A1 * | 12/2017 | Sahasrabudhe | ........ | F02B 75/065 |
| 2017/0361705 A1 * | 12/2017 | Burrell | ................... | B60K 17/28 |
| 2020/0217374 A1 * | 7/2020 | Hedge | ..................... | F16D 11/14 |

FOREIGN PATENT DOCUMENTS

| | | |
|---|---|---|
| FR | 2278519 A1 | 2/1976 |
| FR | 2359719 A1 | 2/1978 |
| FR | 2546597 A1 | 11/1984 |
| FR | 2655115 A1 | 5/1991 |
| WO | 9320367 A1 | 10/1993 |
| WO | 2017132644 A1 | 8/2017 |

OTHER PUBLICATIONS

European Communication Pursuant to Article 94(3) EPC, Application No. 17804350.1, dated Nov. 3, 2020.

* cited by examiner

FIG. 1

(PRIOR ART)

POWER TAKE OFF INCLUDING A TORSIONAL VIBRATION DAMPING ASSEMBLY

CROSS-REFERENCE TO RELATED APPLICATIONS

This application claims the benefit of U.S. Provisional Application No. 62/414,760, filed Oct. 30, 2016, the disclosure of which is incorporated herein by reference.

BACKGROUND OF THE INVENTION

This invention relates in general to power take offs for transmitting rotational energy from a source of rotational energy to a rotatably driven accessory. In particular, this invention relates to an improved structure for such a power take off that includes a torsional vibration damping assembly that minimizes the transmission of torque transients therethrough from the source of rotational energy and, thus, reduces the generation of undesirable noise.

A power take off is a well known mechanical device that is often used in conjunction with a source of rotational energy, such as a vehicle engine or transmission, to transfer rotational energy to a rotatably driven accessory, such as a hydraulic pump that is supported on the vehicle. For example, power take offs are commonly used on industrial and agricultural vehicles to transfer rotational energy from the vehicle engine or transmission to one or more hydraulic pumps that, in turn, are used to operate hydraulically driven accessories provided on the vehicle, such as plows, trash compactors, lifting mechanisms, winches, and the like. The power take off provides a simple, inexpensive, and convenient means for transferring energy from the source of rotational energy to the hydraulic pump that, in turn, can be operated to transfer relatively high pressure fluid to operate the driven accessory.

A typical power take off includes a housing, an input mechanism, and an output mechanism. The power take off housing is adapted to be supported on a housing of the source of rotational energy. The power take off housing includes an opening that is aligned with a corresponding opening provided in the housing of the source of rotational energy. The input mechanism of the power take off includes a portion (typically a spur gear) that extends outwardly from the power take off housing through the aligned openings and into the housing of the source of rotational energy. In this manner, the input mechanism of the power take off is connected to the source of rotational energy so as to be rotatably driven whenever the source of rotational energy is operated. The output mechanism of the power take off is rotatably driven by the input mechanism and is adapted to be connected to the rotatably driven accessory. In some instances, the input mechanism of the power take off is directly connected to the output mechanism such that the rotatably driven accessory is operated whenever the source of rotational energy is operated. In other instances, a clutch assembly is provided between the input mechanism and the output mechanism such that the rotatably driven accessory is operated only when the clutch assembly is engaged while the source of rotational energy is operated.

In many power take offs, the input member includes a cluster gear (or gear cluster), which is a set of gears of different sizes mounted as a unit on a single shaft. A typical cluster gear includes a first gear portion, which is formed having a relatively large diameter and includes a relatively large number of teeth, and a second gear portion, which is formed having a relatively small diameter and includes a relatively small number of teeth. The first and second gear portions may be formed integrally with one another or may be formed as separate pieces that are secured to one another for concurrent rotation. In many instances, the first gear portion of the cluster gear extends outwardly from the power take off housing through the aligned openings and into the housing of the source of rotational energy.

Frequently, the power take off is connected to a crankshaft or similar power-outputting structure of the vehicle engine or transmission so as to be rotatably driven thereby. Reciprocating internal combustion engines and diesel engines are known to generate torsional vibrations, which are cyclical variations in crankshaft speed. These torsional vibrations occur constantly during engine operation and are caused by the nonlinear nature of the combustion events, as well as other events that lead to variations in the amount of torque that is available at the crankshaft. These cyclical variations in crankshaft speed typically exhibit a sinusoidal pattern of alternating periods of acceleration and deceleration relative to an average engine speed.

A gear that is driven by an engine that generates these torsional vibrations will tend to transfer these rapidly varying loads to any gears mated thereto. In some scenarios, such as an engine at idle driving an unloaded gearbox, these engine-generated torsional vibrations can result in the occurrence of a series of either single-sided or double-sided impacts between interfacing teeth in a pair of meshing gears, which usually generates an audible rattle or similar noise. This noise is often referred to as a "neutral rattle" (or sometimes "idle rattle") and has been the subject of much work in the power transmission industry for many years.

Most automotive and heavy truck transmissions on the market include anti-rattle mechanisms designed to minimize or avoid the generation of audible rattles. However, a power take off mounted to a heavy truck transmission may still rattle because the power take off may be driven by gears in the transmission that are located upstream of the anti-rattle mechanism in the transmission. Thus, it would be desirable to provide an improved structure for a power take off that can dampen these torsional vibrations and thereby reduce or eliminate audible rattles.

SUMMARY OF THE INVENTION

This invention relates to an improved structure for a power take off that includes a torsional vibration damping assembly that minimizes the transmission of torque transients therethrough from the source of rotational energy and, thus, reduces the generation of undesirable noise. The power take off includes a housing, an input mechanism that is supported in the housing and is adapted to be rotatably driven by a source of rotational energy, and an output mechanism that is supported in the housing and is rotatably driven by the input mechanism, the output mechanism being adapted to rotatably drive a rotatably driven accessory. The power take off further includes a two piece damping assembly that minimizes the transmission of torque transients from the input mechanism to the output mechanism. The two piece damping assembly may be an input cluster gear assembly that includes a first gear portion and a second gear portion that are supported for rotational movement relative to one another. The two piece damping assembly may also be part of a clutch assembly for selectively the output mechanism to be rotatably driven by the input mechanism.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
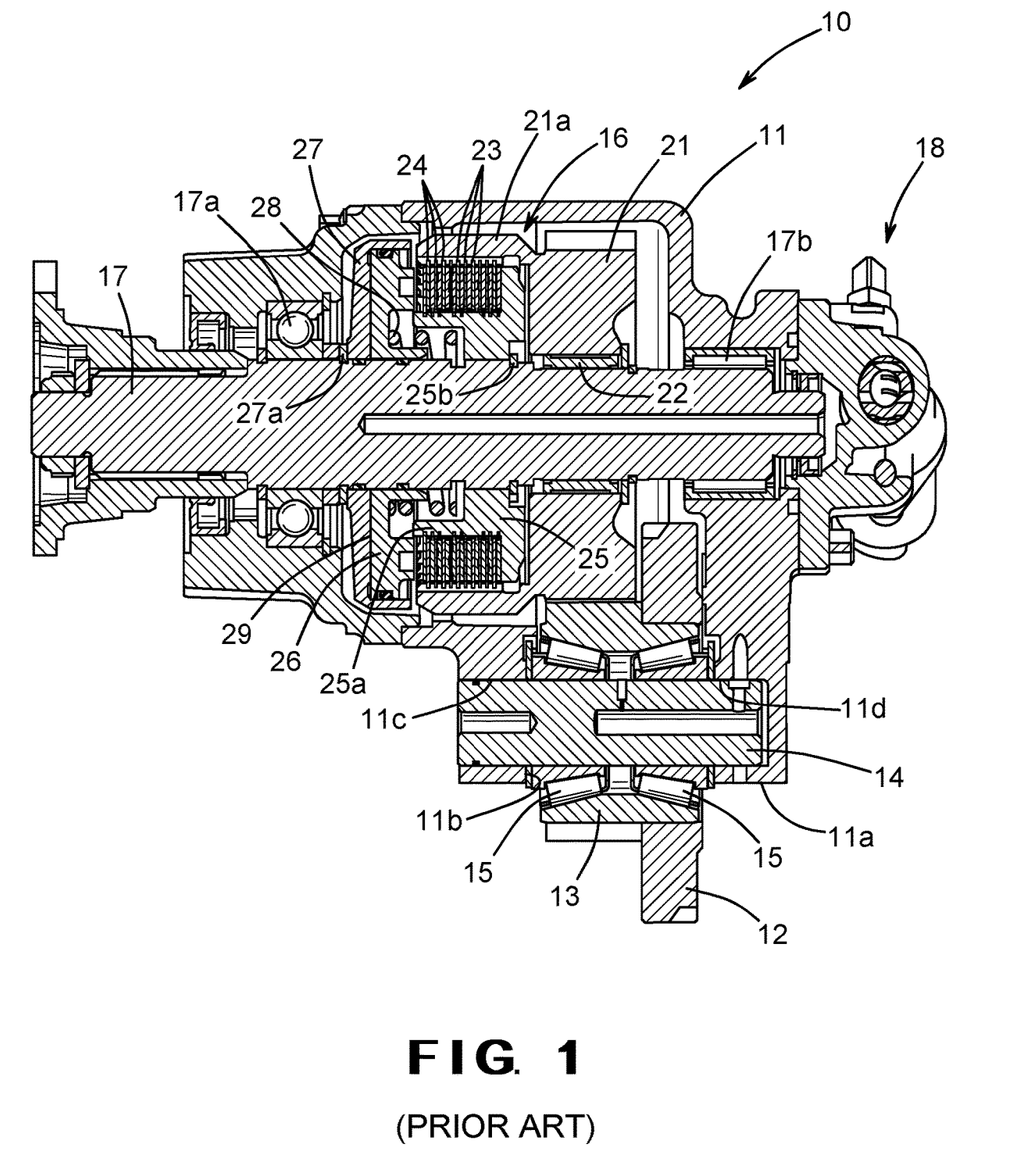
FIG. 1 is a sectional elevational view of a prior art structure for a power take off including a conventional undampened input cluster gear.

Referring now to the drawings, there is illustrated in FIG. 1a sectional elevational view of a prior art power take off, indicated generally at 10, that is conventional in the art. The basic structure and mode of operation of the prior art power take off 10 are well known in the art, and only those portions of the prior art power take off 10 that are necessary for a complete understanding of the invention will be described.

The prior art power take off 10 includes a hollow housing 11 having a mounting surface 11a provided thereon. An opening 11b is provided through the mounting surface 11a of the power take off housing 11. An input gear 12 is rotatably supported within the power take off housing 11 and includes a portion that extends outwardly through the opening 11b provided through the mounting surface 11a.

The mounting surface 11a of the power take off housing 11 is adapted to be secured (typically by a plurality of bolts) to a corresponding mounting surface (not shown) provided on a source of rotational energy (not shown), such as an engine or a transmission of a vehicle. As is well known in the art, the portion of the input gear 12 that extends through the opening 11b of the power take off housing 11 is adapted to extend within a portion of the source of rotational energy and engage a corresponding gear (not shown) or other mechanism provided therein. Thus, the input gear 12 of the power take off 10 is rotatably driven whenever the corresponding gear contained within the source of rotational energy is rotatably driven.

The illustrated input gear 12 is splined onto or otherwise supported on an input gear hub 13 for concurrent rotation to form an input cluster gear. However, it is known to form the input gear 12 and the input gear hub 13 integrally from a single piece of material. In either event, the input gear hub 13 is, in turn, rotatably supported on an input shaft 14 by a pair of roller bearings 15. First and second ends of the illustrated input shaft 14 are respectively (and non-rotatably) supported in first and second bores 11c and 11d provided in the power take off housing 11.

The prior art power take off 10 also includes a clutch assembly, indicated generally at 16, for selectively the connecting the input gear hub 13 to an output shaft 17. The output shaft 17 is, in turn, adapted to be connected to the rotatably driven accessory (not shown). The illustrated output shaft 17 is rotatably supported on the power take off housing 11 by a pair of bearings 17a and 17b or other similar means. When the clutch assembly 16 is engaged, the input gear hub 13 is connected to the output shaft 17 for concurrent rotation. Thus, the rotatably driven accessory is rotatably driven by the source of rotational power when the clutch assembly 16 is engaged. Conversely, when the clutch assembly 16 is disengaged, the input gear hub 13 is disconnected from the output shaft 17. Thus, the rotatably driven accessory is not rotatably driven by the source of rotational power when the clutch assembly 16 is disengaged. A conventional shifter assembly, indicated generally at 18, may be provided to selectively engage and disengage the clutch assembly 16 in a known manner.

The clutch assembly 16 of the prior art power take off 10 includes a drive gear 21 that is rotatably driven by the input gear hub 13. The illustrated drive gear 21 includes an axially-extending hollow cylindrical bell portion 21a having a splined inner surface. The illustrated drive gear 21 is rotatably supported on the output shaft 17 by a bearing 22 and is formed integrally from a single piece of material with the hollow cylindrical bell portion 21a. However, it is known to form the drive gear 21 and the hollow cylindrical bell portion 21a from separate components that are splined or otherwise connected together for concurrent rotation. In either event, a plurality of flat annular clutch plates 23 is splined to the inner splined surface of the hollow cylindrical bell portion 21a of the drive gear 21 for rotation therewith. Thus, the drive gear 21 and the clutch plates 23 are constantly rotatably driven by the input gear 12.

A plurality of annular friction plates 24 is disposed in alternating fashion between the clutch plates 23. The friction plates 24 are splined to an outer splined surface provided on an axially extending cylindrical portion 25a of a clutch gear 25 for rotation therewith. The clutch gear 25 is splined or otherwise secured to the output shaft 17 for rotation therewith. Thus, the friction plates 24, the clutch gear 25, and the output shaft 17 are connected for rotation together as a unit. The clutch gear 25 is restrained from axial movement in one direction (toward the right when viewing FIG. 1) by one or more retaining rings 25b that are mounted on the output shaft 17, for a purpose that will be explained below.

An annular clutch piston 26 is provided for selectively causing the clutch plates 23 and the friction plates 24 to frictionally engage one another so as to engage the clutch assembly 16. To accomplish this, the clutch piston 26 is disposed within a hollow cylindrical clutch cylinder 27. The clutch cylinder 27 has a closed end and an opened end. One end of the clutch piston 26 (the left end when viewing FIG. 1) is disposed within the clutch cylinder 27, while the opposite end of the clutch piston 26 (the right end when viewing FIG. 1) extends from the opened end of the clutch cylinder 27 adjacent to the clutch plates 23 and friction plates 24. Both the clutch piston 26 and the clutch cylinder 27 are supported on the output shaft 17 The clutch piston 26 is axially movable along the output shaft 17 but the clutch cylinder 27 is restrained from axial movement in one direction (toward the left when viewing FIG. 1) by one or more retaining rings 27a that are mounted on the output shaft 17 for a purpose that will be explained below.

A coiled clutch spring 28 reacts between the clutch piston 26 and the clutch gear 25. As discussed above, the clutch gear 25 is restrained from axial movement in one direction (toward the right when viewing FIG. 1) by the retaining ring 25b. Thus, the clutch spring 28 urges the clutch piston 26 axially in the opposite direction (toward the left when viewing FIG. 1) toward a disengaged position adjacent to the closed end of the clutch cylinder 27. In the disengaged position, the clutch piston 26 does not engage the clutch plates 23 and the friction plates 24. Thus, the clutch plates 23 and the friction plates 24 do not frictionally engage one another. As a result, the clutch gear 25 is disconnected from the drive gear 21 so as to provide no rotatable driving connection therebetween.

To engage the clutch assembly 16, the shifter assembly 18 is actuated to supply pressurized fluid to an annular clutch chamber 29 defined between the clutch piston 26 and the closed end of the clutch cylinder 27. As a result, the clutch piston 26 is moved axially in the one direction (toward the right when viewing FIG. 1) toward an engaged position. In the engaged position, the clutch piston 26 causes the clutch plates 23 and the friction plates 24 to frictionally engage one another. As a result, the clutch gear 25 is connected to the drive gear 21 so as to provide a rotatable driving connection therebetween.

Figure 3:
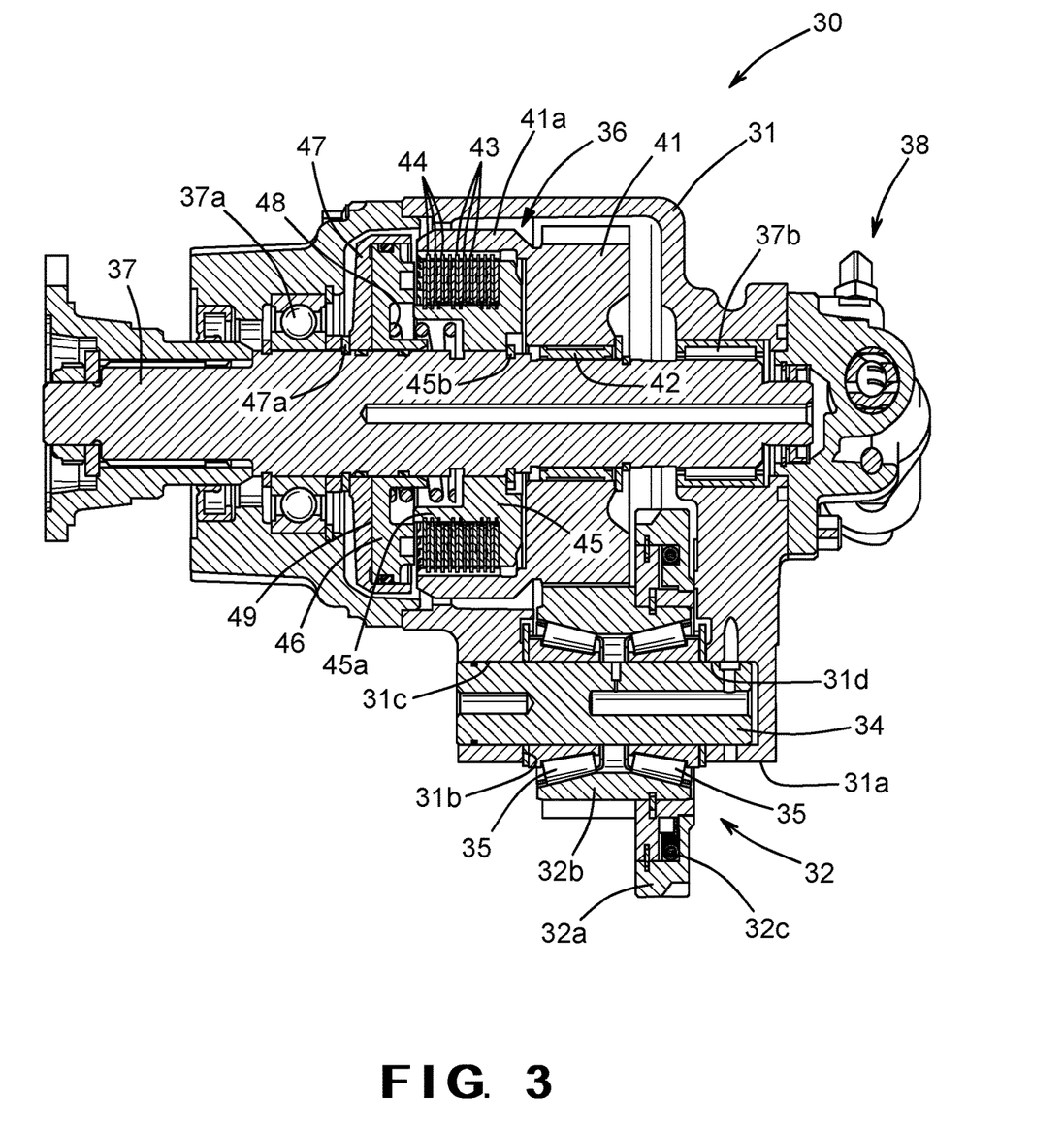
FIG. 3 is a sectional elevational view of an improved structure for a power take off including a first embodiment of a damping input cluster gear assembly in accordance with this invention.

FIG. 3 is a sectional elevational view of a first embodiment of a power take off, indicated generally at 30, in accordance with this invention. The basic structure and mode of operation of the first embodiment of the power take off 30 are also well known in the art, and only those portions of the first embodiment of the power take off 30 that are necessary for a complete understanding of the invention will be described.

The first embodiment of the power take off 30 includes a hollow housing 31 having a mounting surface 31a provided thereon. An opening 31b is provided through the mounting surface 31a of the power take off housing 31. An improved input cluster gear assembly, indicated generally at 32, in accordance with this invention is rotatably supported within the power take off housing 31 and includes a portion that extends outwardly through the opening 31b provided through the mounting surface 31a. The structure and manner of operation of the improved input cluster gear assembly 32 will be described in detail below.

The mounting surface 31a of the power take off housing 31 is adapted to be secured (typically by a plurality of bolts) to a corresponding mounting surface (not shown) provided on a source of rotational energy (not shown), such as an engine or a transmission of a vehicle. As is well known in the art, the portion of the input cluster gear assembly 32 that extends through the opening 31b of the power take off housing 31 is adapted to extend within a portion of the source of rotational energy and engage a corresponding gear (not shown) or other mechanism provided therein. Thus, the input cluster gear assembly 32 of the first embodiment of the power take off 30 is rotatably driven whenever the corresponding gear contained within the source of rotational energy is rotatably driven. The input cluster gear assembly 32 is rotatably supported on an input shaft 34 by a pair of roller bearings 35. First and second ends of the illustrated input shaft 34 are respectively (and non-rotatably) supported in first and second bores 31c and 31d provided in the power take off housing 31.

The first embodiment of the power take off 30 also includes a clutch assembly, indicated generally at 36, for selectively the connecting the input cluster gear assembly 32 to an output shaft 37. The output shaft 37 is, in turn, adapted to be connected to the rotatably driven accessory (not shown). The illustrated output shaft 37 is rotatably supported on the power take off housing 31 by a pair of bearings 37a and 37b or other similar means. When the clutch assembly 36 is engaged, the input cluster gear assembly 32 is connected to the output shaft 37 for concurrent rotation. Thus, the rotatably driven accessory is rotatably driven by the source of rotational power when the clutch assembly 36 is engaged. Conversely, when the clutch assembly 36 is disengaged, the input cluster gear assembly 32 is disconnected from the output shaft 37. Thus, the rotatably driven accessory is not rotatably driven by the source of rotational power when the clutch assembly 36 is disengaged. A conventional shifter assembly, indicated generally at 38, may be provided to selectively engage and disengage the clutch assembly 36 in a known manner.

The clutch assembly 36 includes a drive gear 41 having an axially-extending hollow cylindrical bell portion 41a with a splined inner surface. The illustrated drive gear 41 is rotatably supported on the output shaft 37 by a bearing 42 and is formed integrally from a single piece of material with the hollow cylindrical bell portion 41a. However, it is known to form the drive gear 41 and the hollow cylindrical bell portion 41a from separate components that are splined or otherwise connected together for concurrent rotation. In either event, a plurality of flat annular clutch plates 43 is splined to the inner splined surface of the hollow cylindrical bell portion 41a of the drive gear 41 for rotation therewith. Thus, the drive gear 41 and the clutch plates 43 are constantly rotatably driven by the input cluster gear assembly 32.

A plurality of annular friction plates 44 is disposed in alternating fashion between the clutch plates 43. The friction plates 44 are splined to an outer splined surface provided on an axially extending cylindrical portion 45a of a clutch gear 45 for rotation therewith. The clutch gear 45 is splined or otherwise secured to the output shaft 37 for rotation therewith. Thus, the friction plates 44, the clutch gear 45, and the output shaft 37 are connected for rotation together as a unit. The clutch gear 45 is restrained from axial movement in one direction (toward the right when viewing FIG. 3) by one or more retaining rings 45b that are mounted on the output shaft 17, for the same purpose described above.

An annular clutch piston 46 is provided for selectively causing the clutch plates 43 and the friction plates 44 to frictionally engage one another so as to engage the clutch assembly 36. To accomplish this, the clutch piston 46 is disposed within a hollow cylindrical clutch cylinder 47. The clutch cylinder 47 has a closed end and an opened end. One end of the clutch piston 46 (the left end when viewing FIG. 3) is disposed within the clutch cylinder 47, while the opposite end of the clutch piston 46 (the right end when viewing FIG. 3) extends from the opened end of the clutch cylinder 47 adjacent to the clutch plates 43 and friction plates 44. Both the clutch piston 46 and the clutch cylinder 47 are supported on the output shaft 33. The clutch piston 46 is axially movable along the output shaft 33, but the clutch cylinder 47 is restrained from axial movement in one direction (toward the left when viewing FIG. 3) by one or more retaining rings 47a that are mounted on the output shaft 33, for the same purpose described above.

A coiled clutch spring 48 reacts between the clutch piston 46 and the clutch gear 45. As discussed above, the clutch gear 45 is restrained from axial movement in one direction (toward the right when viewing FIG. 3) by the retaining ring 45b. Thus, the clutch spring 48 urges the clutch piston 46 axially in the opposite direction (toward the left when viewing FIG. 3) toward a disengaged position adjacent to the closed end of the clutch cylinder 47. In the disengaged position, the clutch piston 46 does not engage the clutch plates 43 and the friction plates 44. Thus, the clutch plates 43 and the friction plates 44 do not frictionally engage one another. As a result, the clutch gear 45 is disconnected from the drive gear 41 so as to provide no rotatable driving connection therebetween.

To engage the clutch assembly 36, the shifter assembly 38 is actuated to supply pressurized fluid to an annular clutch chamber 49 defined between the clutch piston 46 and the closed end of the clutch cylinder 47. As a result, the clutch piston 46 is moved axially in the one direction (toward the right when viewing FIG. 3) toward an engaged position. In the engaged position, the clutch piston 46 causes the clutch plates 43 and the friction plates 44 to frictionally engage one another. As a result, the clutch gear 45 is connected to the drive gear 41 so as to provide a rotatable driving connection therebetween.

Figure 2:
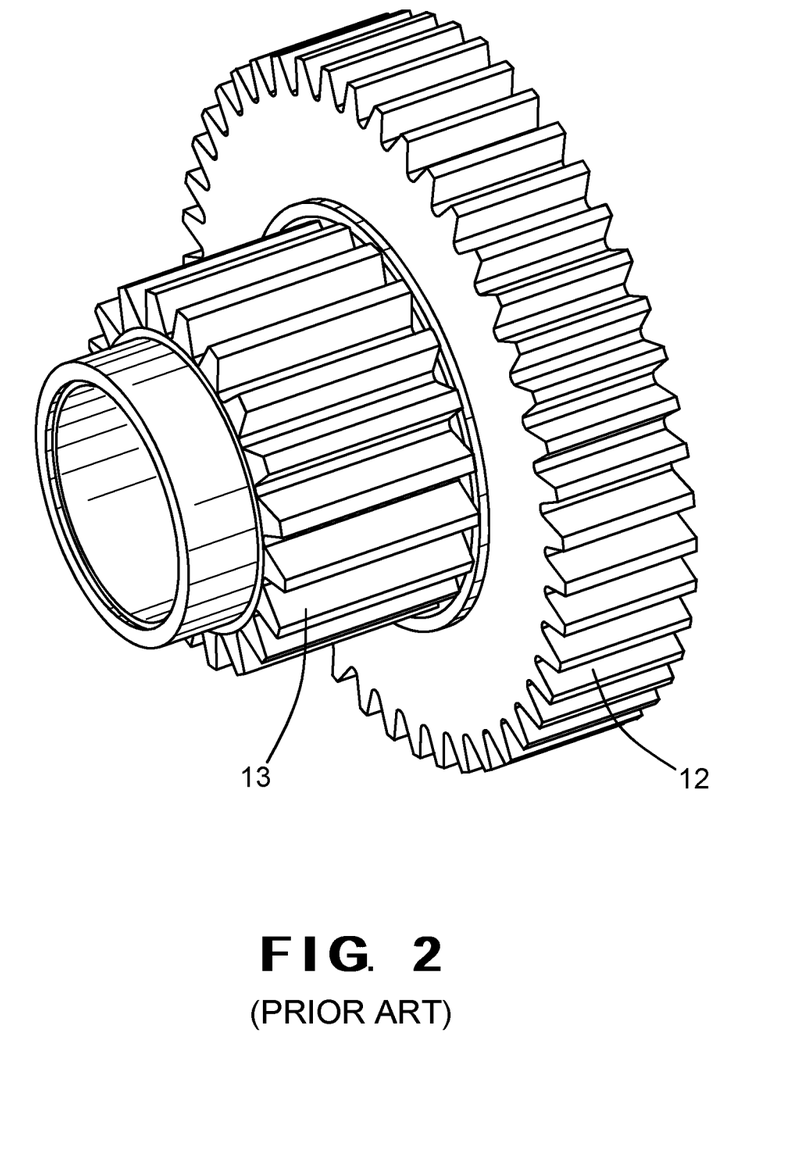
FIG. 2 is an enlarged perspective view of the conventional undampened input cluster gear illustrated in FIG. 1.

FIGS. 4 through 9 illustrate the basic structure and stages of operation of the input cluster gear assembly 32 of the first embodiment of the power take off 30 of this invention. As will become apparent below, the input cluster gear assembly 32 of the first embodiment of this invention is essentially a dual mass damper mechanism, i.e., a rotating mechanism that employs two independent and concentrically located masses connected by one or more springs such that sudden fluctuations in torque on the driving side will not be fully transmitted to the driven side. The dual mass damper mechanism of the first embodiment of this invention is incorporated into the input cluster gear assembly 32 and is preferably (but not necessarily) designed to fit in the same physical envelope as the prior art input gear 12 and input gear hub 13 illustrated in FIGS. 1 and 2.

The input cluster gear assembly 32 of the first embodiment of this invention includes a first gear portion 32a and a second gear portion 32b that are supported for rotational movement relative to one another. The first gear portion 32a (which is analogous to the input gear 12 of the prior art power take off 10) extends through the opening 31b of the power take off housing 31 is adapted to extend within the portion of the source of rotational energy and engage the corresponding gear (not shown) or other mechanism provided therein, as described above. The second gear portion (which is analogous to the input gear hub 13 of the prior art power take off 10) is adapted to engage and rotatably drive the drive gear 41 of the clutch assembly 36, as also described above. In the illustrated embodiment, the first gear portion 32a is journaled on the second gear portion 32b for such relative rotational movement, although such is not required.

The first gear portion 32a of the input cluster gear assembly 32 includes a first stop 32a' that extends radially inwardly therefrom. Similarly, the second gear portion 32b of the input cluster gear assembly 32 includes a second stop 32b' that extends radially outwardly therefrom. The first stop 32a' and the second stop 32b' are rotationally aligned such that, under certain circumstances, they can abut one another. Thus, the first stop 32a' and the second stop 32b' cooperate to limit the amount of relative rotational movement that is permitted to occur between the first gear portion 32a and the second gear portion 32b.

Figure 4:
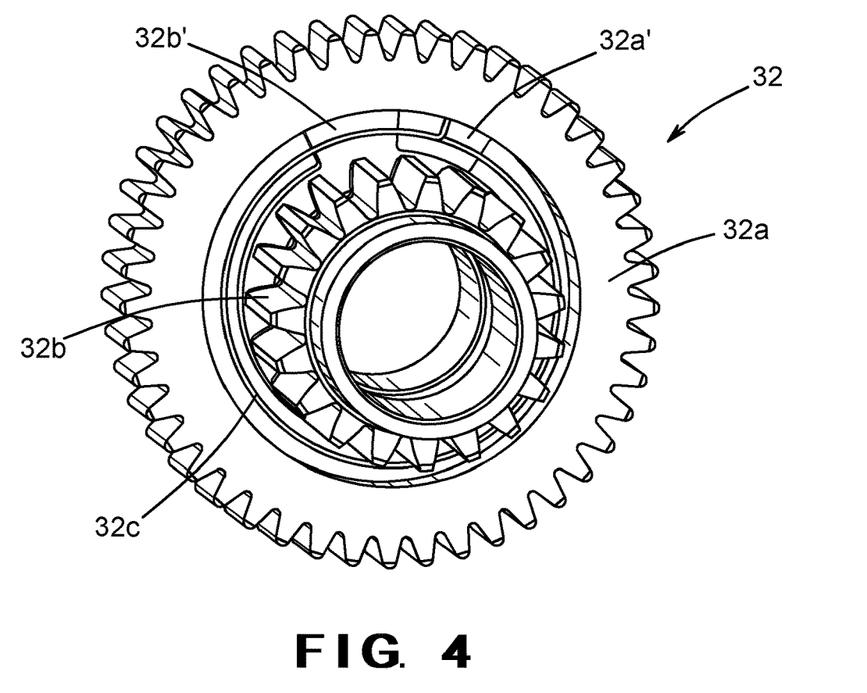
FIG. 4 is a schematic perspective view of the damping input cluster gear assembly illustrated in FIG. 3.
Figure 5:
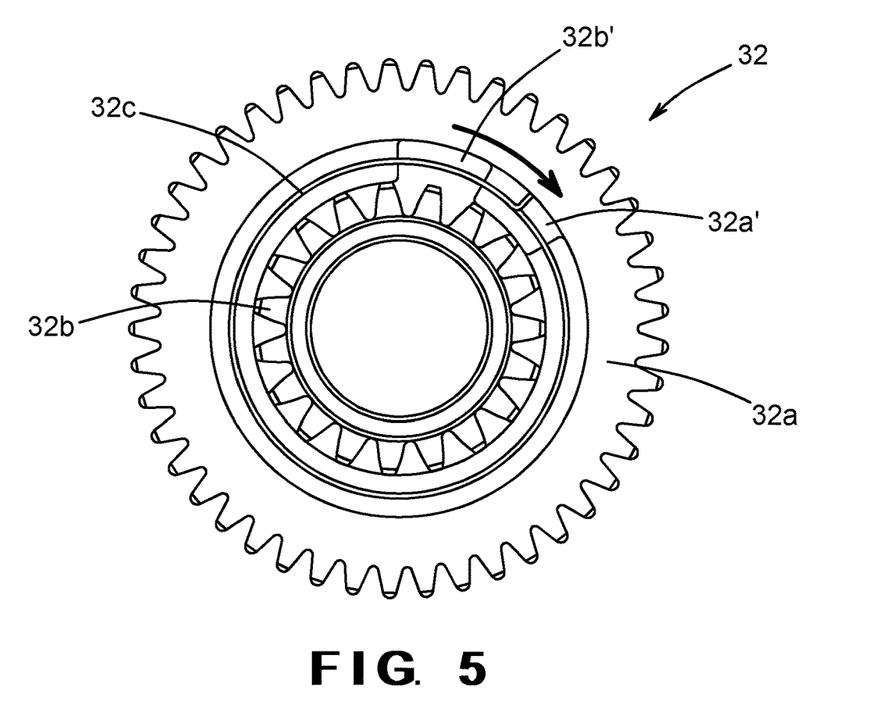
FIG. 5 is a schematic elevational view of the damping input cluster gear assembly illustrated in FIG. 4 shown in an unloaded condition.

A spring 32c is provided for rotationally urging the first gear portion 32a and the second gear portion 32b toward a predetermined position relative to one another. As shown in FIGS. 4 and 5, the spring 32c rotationally urges the first gear portion 32a counterclockwise relative to the second gear portion 32b such that the first stop 32a' abuts the second stop 32b', thereby limiting further such relative counterclockwise rotational movement. In the illustrated embodiment, the spring 32c is a torsional spring having a first end that is connected to the first gear portion 32a and a second end that is connected to the second gear portion 32b. However, the illustrated spring 32c is intended to be representative of any structure, mechanical or otherwise, that is capable of urging the first gear portion 32a and the second gear portion 32b toward a predetermined rotational position relative to one another.

FIGS. 5 through 9 illustrate in detail the manner in which the input cluster gear assembly 32 functions during operation of the first embodiment of the power take off 30. FIG. 5 shows the input cluster gear assembly 32 in an unloaded condition, wherein no (or very little) rotational force is exerted against the first gear portion 32a by the corresponding gear provided within the source of rotational energy, as described above. In this condition, the first stop 32a' and the second stop 32b' are maintained in abutting engagement with one another by the virtue of the force of the spring 32c that reacts between the first gear portion 32a and the second gear portion 32b. As a result, torsional vibrations that are applied to the input cluster gear assembly 32 are dampened by the urging of the spring 32c. Thus, the amount of undesirable noise that is generated as a result of such torsional vibrations is effectively reduced or eliminated.

Figure 6:
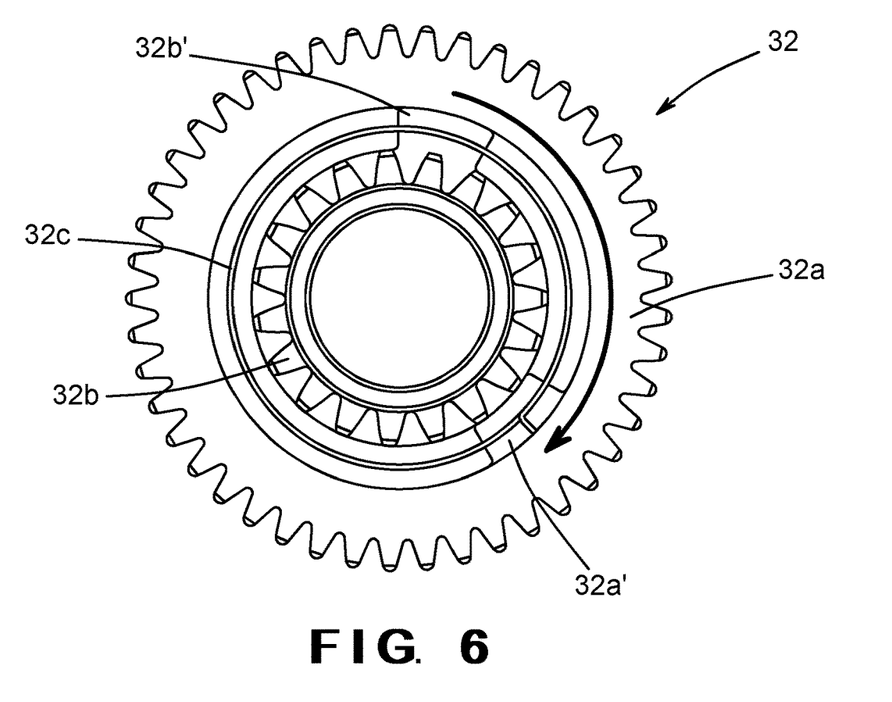
FIG. 6 is a schematic elevational view of the damping input cluster gear assembly illustrated in FIG. 5 shown in an initially loaded condition.
Figure 7:
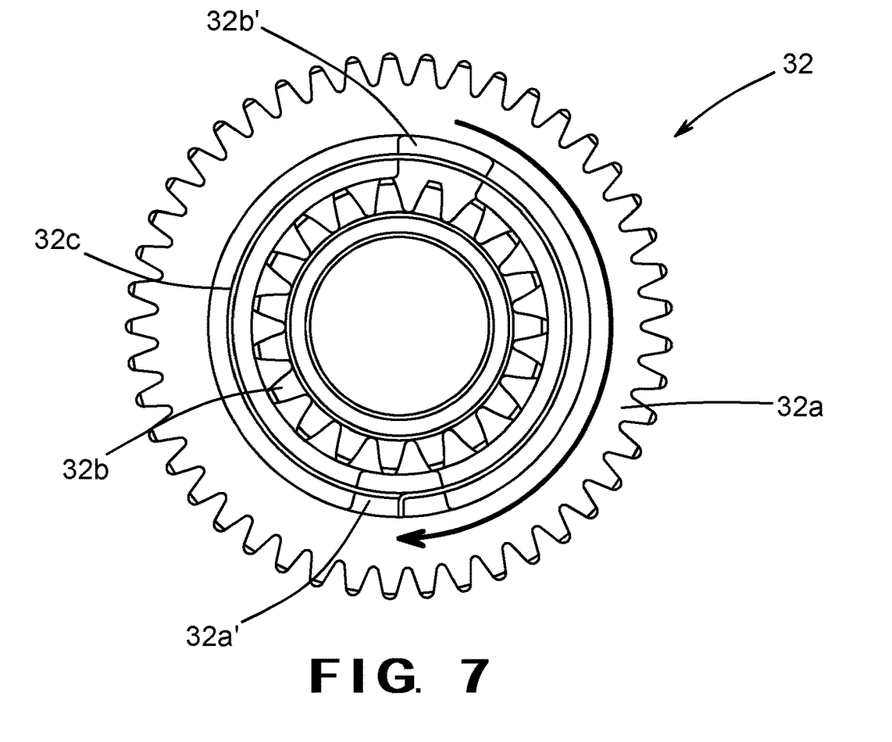
FIG. 7 is a schematic elevational view of the damping input cluster gear assembly illustrated in FIG. 6 shown in a partially increased loaded condition.
Figure 8:
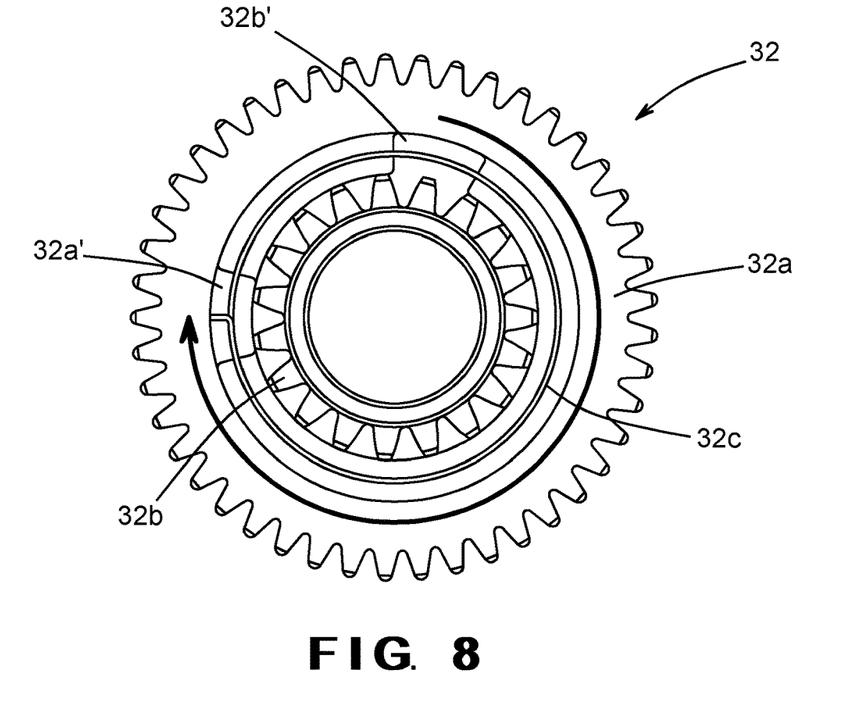
FIG. 8 is a schematic elevational view of the damping input cluster gear assembly illustrated in FIG. 7 shown in a further increased loaded condition.

FIGS. 6 through 8 show the relative orientations of the first gear portion 32a and the second gear portion 32b as the input cluster gear assembly 32 is subjected to increasingly loaded conditions by the corresponding gear provided within the source of rotational energy, as described above. As shown therein, the first gear portion 32a is rotated in the clockwise direction relative to the second gear portion 32b by increasing amounts, in accordance with the increasing amounts of rotational force are exerted against the input gear portion by the external driving gear. In each of these illustrated conditions, however, the first stop 32a' and the second stop 32b' are maintained out of abutting engagement with one another. As a result, the amount of undesirable noise that is generated as a result of the above-described torsional vibrations is also effectively reduced or eliminated.

Figure 9:
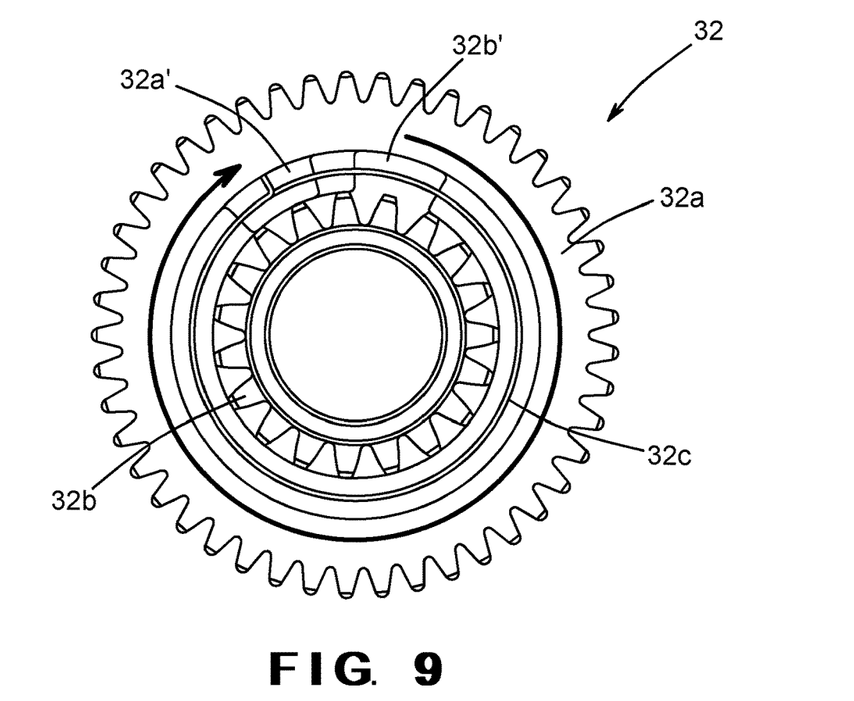
FIG. 9 is a schematic elevational view of the damping input cluster gear assembly illustrated in FIG. 8 shown in a fully loaded condition.

Lastly, FIG. 9 shows the relative orientations of the first gear portion 32a and the second gear portion 32b as the input cluster gear assembly 32 is fully loaded by the corresponding gear provided within the source of rotational energy, as described above. As shown therein, the first gear portion 32a is rotated in the clockwise direction relative to the second gear portion 32b until the first stop 32a' again abuts the second stop 32b'. As a result of this fully loaded condition, however, the amount of undesirable noise that is generated as a result of the above-described torsional vibrations is also effectively reduced or eliminated.

Thus, whenever the first embodiment of the power take off 30 is being operated under a relatively small amount of load, the input cluster gear assembly 32 functions to reduce or eliminate the amount of undesirable noise that is generated as a result of the above-described torsional vibrations. This occurs because the input cluster gear assembly 32 allows the first gear portion 32a to move relative to the second gear portion 32b, with some resistance to such relative rotational movement being provided by the spring 32c that reacts therebetween. The total amount of such relative rotational movement is limited by the two stops 32a' and 32b'. When the two stops 32a' and 32b' contact one another, the relationship between the first gear portion 32a and the second gear portion 32b becomes fixed (i.e., no further relative rotational movement occurs therebetween). Torsional vibrations of the source of rotational energy, particularly at idle, will be largely absorbed by the spring 32c, thus reducing or eliminating tooth-to-tooth impact energy that could be passed along in the form of undesirable noise.

A variety of alternatives are contemplated by this invention. For example, the illustrated torsional spring 32c may be replaced by a coiled spring or any other device (mechanical or otherwise) that reacts between or otherwise urges the first gear portion 32a and the second gear portion 32b to function in the general manner described above. Additionally, the illustrated single torsional spring 32c may be replaced by a plurality of springs (having any desired structure or combination of structures) that function in the general manner described above.

Figure 10:
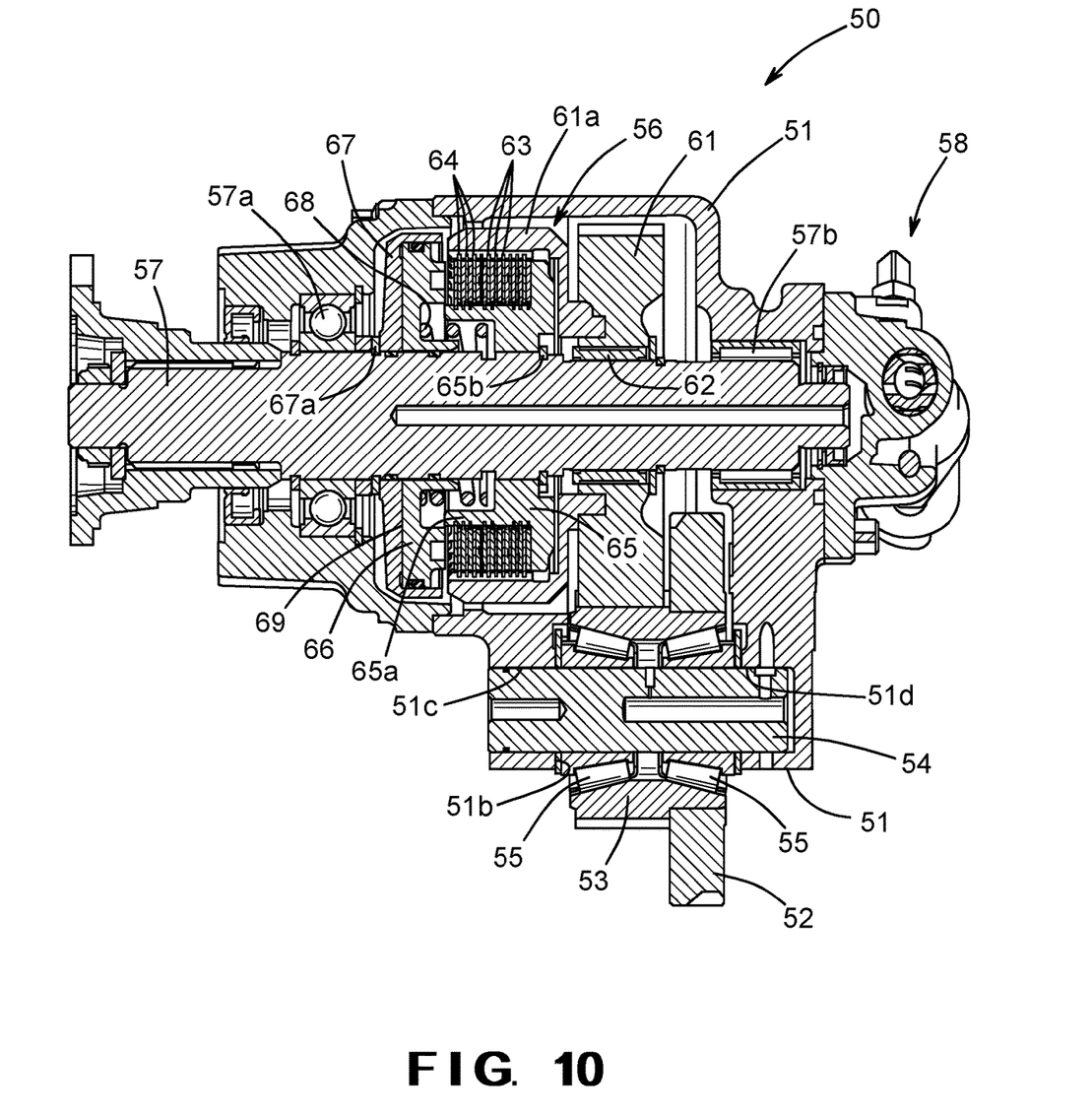
FIG. 10 is a sectional elevational view of an improved power take off including a second embodiment of a two piece damping gear assembly in accordance with this invention.

FIG. 10 is a sectional elevational view of a second embodiment of a power take off, indicated generally at 50, in accordance with this invention. The basic structure and mode of operation of the second embodiment of the power take off 50 are well known in the art, and only those portions of the second embodiment of the power take off 50 that are necessary for a complete understanding of the invention will be described.

The second embodiment of the power take off 50 includes a hollow housing 51 having a mounting surface 51a provided thereon. An opening 51b is provided through the mounting surface 51a of the power take off housing 51. An input gear 52 is rotatably supported within the power take off housing 51 and includes a portion that extends outwardly through the opening 51b provided through the mounting surface 51a.

The mounting surface 51a of the power take off housing 51 is adapted to be secured (typically by a plurality of bolts) to a corresponding mounting surface (not shown) provided on a source of rotational energy (not shown), such as an engine or a transmission of a vehicle. As is well known in the art, the portion of the input gear 52 that extends through the opening 51b of the power take off housing 51 is adapted to extend within a portion of the source of rotational energy and engage a corresponding gear (not shown) or other mechanism provided therein. Thus, the input gear 52 of the second embodiment of the power take off 50 of this invention is rotatably driven whenever the corresponding gear contained within the source of rotational energy is rotatably driven.

The illustrated input gear 52 is splined onto or otherwise supported on an input gear hub 53 for concurrent rotation to form an input cluster gear. However, it is known to form the input gear 52 and the input gear hub 53 integrally from a single piece of material. In either event, the input gear hub 53 is, in turn, rotatably supported on an input shaft 54 by a pair of roller bearings 55. First and second ends of the illustrated input shaft 54 are respectively (and non-rotatably) supported in first and second bores 51c and 51d provided in the power take off housing 51.

The second embodiment of the power take off 50 of this invention also includes a clutch assembly, indicated generally at 56, for selectively the connecting the input gear hub 53 to an output shaft 57. The output shaft 57 is, in turn, adapted to be connected to the rotatably driven accessory (not shown). The illustrated output shaft 57 is rotatably supported on the power take off housing 51 by a pair of bearings 57a and 57b or other similar means. When the clutch assembly 56 is engaged, the input gear hub 53 is connected to the output shaft 57 for concurrent rotation. Thus, the rotatably driven accessory is rotatably driven by the source of rotational power when the clutch assembly 56 is engaged. Conversely, when the clutch assembly 56 is disengaged, the input gear hub 53 is disconnected from the output shaft 57. Thus, the rotatably driven accessory is not rotatably driven by the source of rotational power when the clutch assembly 56 is disengaged. A conventional shifter assembly, indicated generally at 58, may be provided to selectively engage and disengage the clutch assembly 56 in a known manner.

The clutch assembly 56 of the second embodiment of the power take off 50 has a cluster gear assembly that includes a drive gear portion 61 and an axially-extending hollow cylindrical bell portion 61a with a splined inner surface. The structure and manner of operation of the drive gear portion 61 and the axially-extending hollow cylindrical bell portion 61a will be described in detail below. The illustrated drive gear 61 is rotatably supported on the output shaft 57 by a bearing 62 and is rotatably driven by the input gear hub 53. A plurality of flat annular clutch plates 63 is splined to the inner splined surface of the hollow cylindrical bell portion 61a for rotation therewith. Thus, the drive gear 61, the hollow cylindrical bell portion 61a, and the clutch plates 63 are constantly rotatably driven by the input gear 52.

A plurality of annular friction plates 64 is disposed in alternating fashion between the clutch plates 63. The friction plates 64 are splined to an outer splined surface provided on an axially extending cylindrical portion 65a of a clutch gear 65 for rotation therewith. The clutch gear 65 is splined or otherwise secured to the output shaft 57 for rotation therewith. Thus, the friction plates 64, the clutch gear 65, and the output shaft 57 are connected for rotation together as a unit. The clutch gear 65 is restrained from axial movement in one direction (toward the right when viewing FIG. 1) by one or more retaining rings 65b that are mounted on the output shaft 57, for a purpose that will be explained below.

An annular clutch piston 66 is provided for selectively causing the clutch plates 63 and the friction plates 64 to frictionally engage one another so as to engage the clutch assembly 56. To accomplish this, the clutch piston 66 is disposed within a hollow cylindrical clutch cylinder 67. The clutch cylinder 67 has a closed end and an opened end. One end of the clutch piston 66 (the left end when viewing FIG. 10) is disposed within the clutch cylinder 67, while the opposite end of the clutch piston 66 (the right end when viewing FIG. 10) extends from the opened end of the clutch cylinder 67 adjacent to the clutch plates 63 and friction plates 64. Both the clutch piston 66 and the clutch cylinder 67 are supported on the output shaft 57. The clutch piston 66 is axially movable along the output shaft 57, but the clutch cylinder 67 is restrained from axial movement in one direction (toward the left when viewing FIG. 1) by one or more retaining rings 67a that are mounted on the output shaft 57, for a purpose that will be explained below.

A coiled clutch spring 68 reacts between the clutch piston 66 and the clutch gear 65. As discussed above, the clutch gear 65 is restrained from axial movement in one direction (toward the right when viewing FIG. 10) by the retaining rings 65b. Thus, the clutch spring 68 urges the clutch piston 66 axially in the opposite direction (toward the left when viewing FIG. 10) toward a disengaged position adjacent to the closed end of the clutch cylinder 67. In the disengaged position, the clutch piston 66 does not engage the clutch plates 63 and the friction plates 64. Thus, the clutch plates 63 and the friction plates 64 do not frictionally engage one another. As a result, the clutch gear 65 is disconnected from the drive gear 61 so as to provide no rotatable driving connection therebetween.

To engage the clutch assembly 56, the shifter assembly 58 is actuated to supply pressurized fluid to an annular clutch chamber 69 defined between the clutch piston 66 and the closed end of the clutch cylinder 67. As a result, the clutch piston 66 is moved axially in the one direction (toward the right when viewing FIG. 10) toward an engaged position. In the engaged position, the clutch piston 66 causes the clutch plates 63 and the friction plates 64 to frictionally engage one another. As a result, the clutch gear 65 is connected to the drive gear portion 61 and the axially-extending hollow cylindrical bell portion 61a so as to provide a rotatable driving connection therebetween.

FIGS. 11 through 14 illustrate the basic structure and stages of operation of the drive gear portion 61 and the axially-extending hollow cylindrical bell portion 61a of the clutch assembly 56 of the second embodiment of the power take off 50 of this invention. As will become apparent below, the drive gear portion 61 and the axially-extending hollow cylindrical bell portion 61a of the second embodiment of this invention is also essentially a dual mass damper mechanism, i.e., a rotating mechanism that employs two independent and concentrically located masses connected by one or more springs such that sudden fluctuations in torque on the driving side will not be fully transmitted to the driven side. The dual mass damper mechanism of the second embodiment of this invention is incorporated into the drive gear portion 61 and the axially-extending hollow cylindrical bell portion 61a and is preferably (but not necessarily) designed to fit in the same physical envelope as the drive gear 41 and the hollow cylindrical bell portion 41a illustrated in FIGS. 3 through 9.

Figure 11:
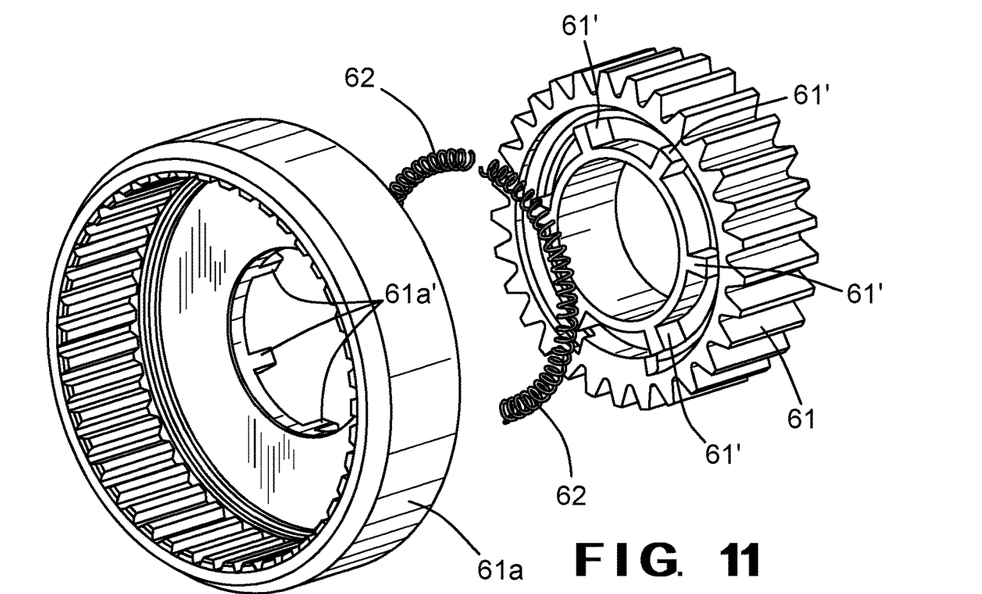
FIG. 11 is a schematic exploded perspective view of the two piece damping gear assembly shown in FIG. 10.

The drive gear portion 61 and the axially-extending hollow cylindrical bell portion 61a are supported for rotational movement relative to one another. As best shown in FIG. 11, the drive gear portion 61 includes a plurality of first stops 61' extending radially inwardly therefrom and that define a plurality of circumferentially extending openings. The hollow cylindrical bell portion 61a includes a plurality of second stops 61a' extending axially outwardly therefrom into respective ones of the circumferentially extending openings defined in the drive gear portion 61. The plurality of first stops 61' and the plurality of second stops 61a' are rotationally aligned such that, under certain circumstances, they can abut one another. Thus, the plurality of first stops 61' and the plurality of second stops 61a' cooperate to limit the amount of relative rotational movement that is permitted to occur between the drive gear portion 61 and the hollow cylindrical bell portion 61a.

A pair of springs 62 is provided for rotationally urging the drive gear portion 61 and the hollow cylindrical bell portion 61a toward a predetermined position relative to one another. As shown in FIG. 11, the pair of springs 62 rotationally urge the drive gear portion 61 clockwise relative to the hollow cylindrical bell portion 61a such that the plurality of first stops 61' abut the plurality of second stops 61a', thereby limiting further such relative clockwise rotational movement. In the illustrated embodiment, the springs 62 are coiled torsional springs having first ends that are connected to the drive gear portion 61 and second ends that are connected to the hollow cylindrical bell portion 61a. However, the illustrated springs 62 are intended to be representative of any structure, mechanical or otherwise, that is capable of urging the drive gear portion 61 and the hollow cylindrical bell portion 61a toward a predetermined rotational position relative to one another.

Figure 12:
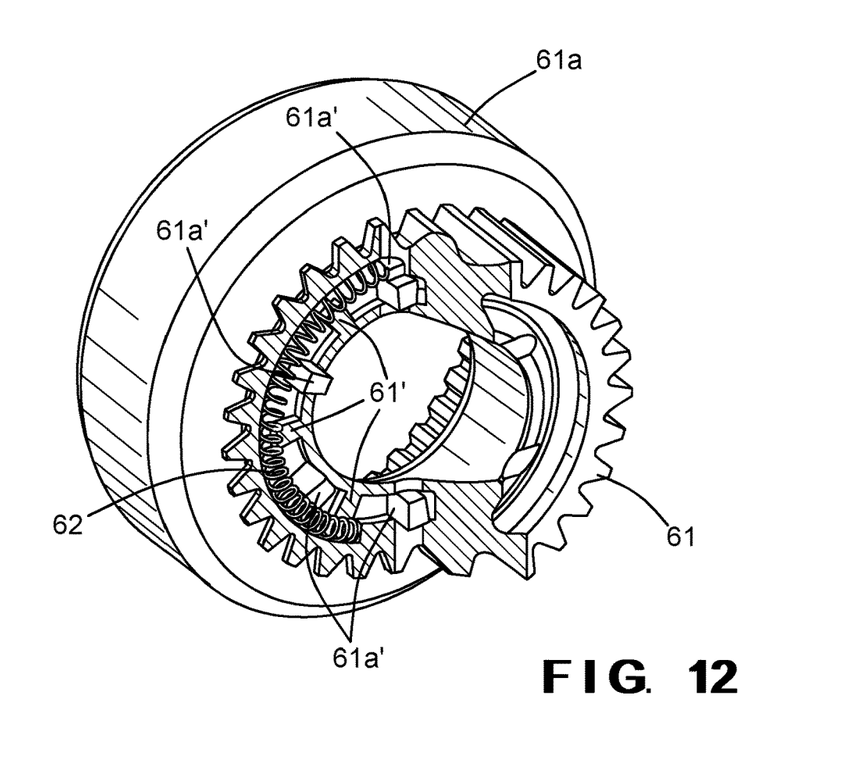
FIG. 12 is a schematic perspective view of the two piece damping gear assembly illustrated in FIG. 11 shown in an initially loaded condition.
Figure 13:
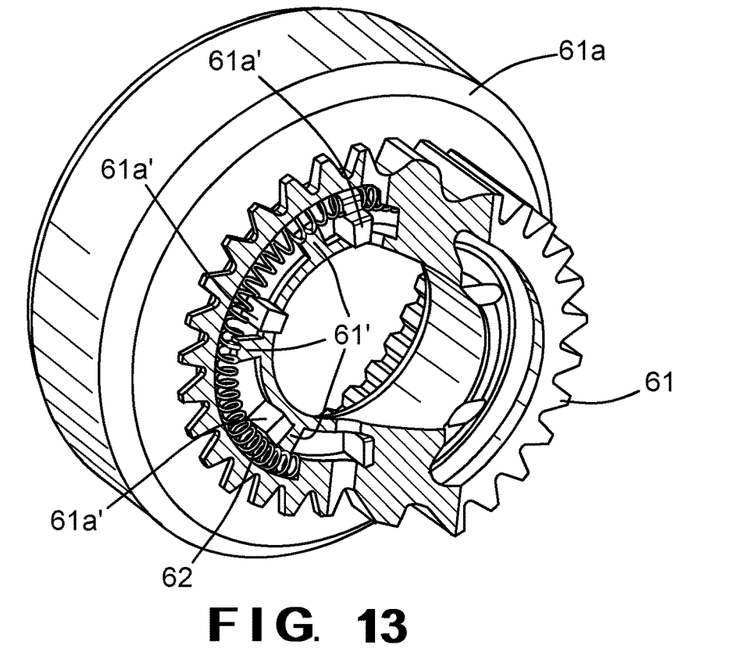
FIG. 13 is a schematic perspective view of the two piece damping gear assembly illustrated in FIG. 12 shown in an increased loaded condition.
Figure 14:
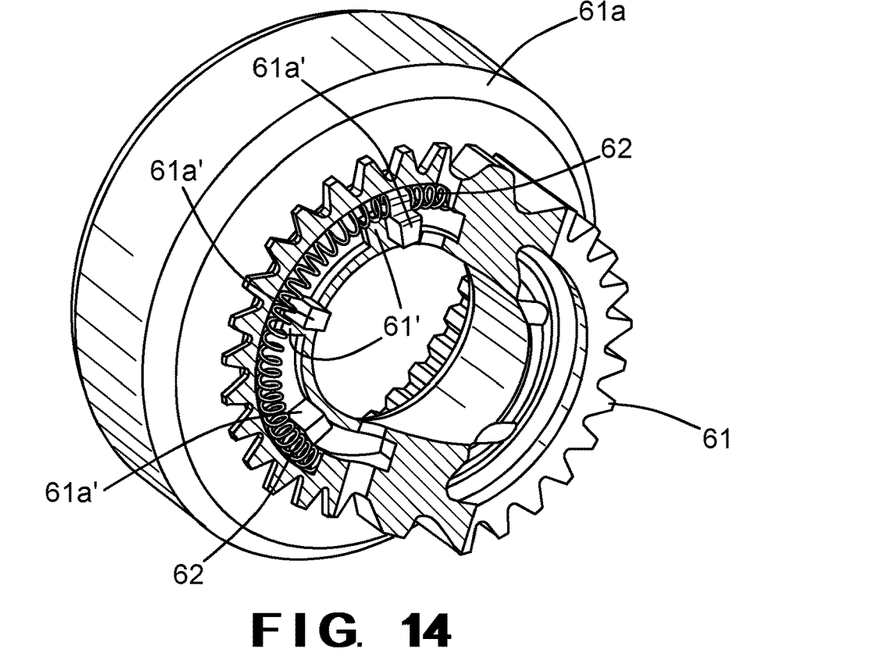
FIG. 14 is a schematic perspective view of the two piece damping gear assembly illustrated in FIG. 13 shown in a fully loaded condition.

FIGS. 12 through 14 illustrate in detail the manner in which the drive gear portion 61 and the hollow cylindrical bell portion 61a function during operation of the second embodiment of the power take off 50 as they are subjected to increasingly loaded conditions by the source of rotational energy, as described above. As shown in FIGS. 12 and 13, the drive gear portion 61 is rotated in the counterclockwise direction relative to the hollow cylindrical bell portion 61a by increasing amounts, in accordance with the increasing amounts of rotational force are exerted against the drive gear portion 61 by the external driving gear. In each of these illustrated conditions, however, the plurality of first stops 61' and the plurality of second stops 61a' are maintained out of abutting engagement with one another. As a result, the amount of undesirable noise that is generated as a result of the above-described torsional vibrations is effectively reduced or eliminated.

FIG. 14 shows the relative orientations of the drive gear portion 61 and the hollow cylindrical bell portion 61a as the assembly is fully loaded by the corresponding gear provided within the source of rotational energy, as described above. As shown therein, the drive gear portion 61 is rotated in the counterclockwise direction relative to the hollow cylindrical bell portion 61a until the plurality of first stops 61' abuts the plurality of second stops 61a'. As a result of this fully loaded condition, however, the amount of undesirable noise that is generated as a result of the above-described torsional vibrations is also effectively reduced or eliminated.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A power take off comprising:
a housing;
an input mechanism that is supported in the housing and is adapted to be rotatably driven by a source of rotational energy; and
an output mechanism that is supported in the housing and is rotatably driven by the input mechanism, the output mechanism being adapted to rotatably drive a rotatably driven accessory,
wherein the power take off further includes a two piece damping assembly that minimizes the transmission of torque transients from the input mechanism to the output mechanism, wherein the two piece damping assembly includes (1) a first gear portion that includes a first stop, (2) a second gear portion that is supported for limited rotation relative to the first gear portion and includes a second stop, and (3) a spring that urges the first gear portion and the second gear portion toward a predetermined relative position, wherein the first stop and the second stop cooperate to limit rotation of the second gear portion relative to the first gear portion; wherein the two piece damping assembly is part of a clutch assembly for selectively causing the output mechanism to be rotatably driven by the input mechanism;

the two piece damping assembly is a cluster gear assembly that includes a drive gear portion and an axially-extending hollow cylindrical bell portion with a splined inner surface; and the drive gear portion includes a plurality of first stops that define a plurality of circumferentially extending openings, and wherein the hollow cylindrical bell portion includes a plurality of second stops that extend into respective ones of the circumferentially extending openings defined in the drive gear portion.

2. The power take off defined in claim 1 wherein the housing is adapted to be supported on a housing of the source of rotational energy.

3. The power take off defined in claim 1 wherein the housing includes an opening, and wherein a portion of the input mechanism extends outwardly from the housing through the opening.

4. The power take off defined in claim 1 wherein the two piece damping assembly is an input cluster gear assembly that includes the first gear portion and the second gear portion that are supported for rotational movement relative to one another.

5. The power take off defined in claim 4 wherein the housing includes an opening, and wherein the first gear portion extends outwardly from the housing through the opening.

6. The power take off defined in claim 4 wherein the first gear portion is journaled on the second gear portion for rotational movement relative to one another.

7. The power take off defined in claim 4 wherein the first stop extends radially inwardly from the first gear portion and the second stop extends radially outwardly from the second gear portion.

8. The power take off defined in claim 4 wherein the first stop and the second stop are rotationally aligned.

9. The power take off defined in claim 4 wherein the spring reacts between the first gear portion and the second gear portion to urge the first gear portion and the second gear portion toward the predetermined position relative to one another.

10. The power take off defined in claim 9 wherein the spring rotationally urges the first gear portion relative to the second gear portion such that the first stop abuts the second stop.

11. The power take off defined in claim 1 further including a spring that rotationally urges the drive gear portion and the hollow cylindrical bell portion toward a predetermined position relative to one another.

* * * * *

UNITED STATES PATENT AND TRADEMARK OFFICE
CERTIFICATE OF CORRECTION

| | | |
|---|---|---|
| PATENT NO. | : 11,149,796 B2 | |
| APPLICATION NO. | : 16/337425 | |
| DATED | : October 19, 2021 | |
| INVENTOR(S) | : Jonathan S. Hedge and Gregory Friend | |

It is certified that error appears in the above-identified patent and that said Letters Patent is hereby corrected as shown below:

On the Title Page (71) Applicants:, please correct from:
"(71) Applicants: Parker-Hannifin Corporation, Cleveland, OH (US); Jason A. Friend, Collierville, TN (US)"

To:
--(71) Applicants: Parker-Hannifin Corporation, Cleveland, OH (US)--

Signed and Sealed this
Thirtieth Day of January, 2024

*Katherine Kelly Vidal*

Katherine Kelly Vidal
*Director of the United States Patent and Trademark Office*